(12) United States Patent
Larson (10) Patent No.: US 7,844,482 B1
(45) Date of Patent: Nov. 30, 2010

(54) MECHANISM FOR COLLECTING FEEDBACK FROM USERS

(75) Inventor: Chris Larson, Oceanside, CA (US)

(73) Assignee: Intuit Inc., Mountain View, CA (US)

( * ) Notice: Subject to any disclaimer, the term of this patent is extended or adjusted under 35 U.S.C. 154(b) by 1312 days.

(21) Appl. No.: 11/365,128

(22) Filed: Feb. 28, 2006

(51) Int. Cl.
*G06F 17/30* (2006.01)
(52) U.S. Cl. ...................................................... 705/10
(58) Field of Classification Search ..................... 705/10
See application file for complete search history.

(56) References Cited

U.S. PATENT DOCUMENTS

| | | | |
|---|---|---|---|
| 2003/0126150 A1* | 7/2003 | Chan ........................... | 707/100 |
| 2003/0163359 A1* | 8/2003 | Kanesaka ....................... | 705/8 |
| 2003/0195800 A1* | 10/2003 | Peters .......................... | 705/14 |
| 2003/0222134 A1* | 12/2003 | Boyd .......................... | 235/375 |
| 2004/0260604 A1* | 12/2004 | Bedingfield, Sr. ............ | 705/14 |
| 2005/0010786 A1* | 1/2005 | Michener et al. ............ | 713/185 |
| 2005/0033641 A1* | 2/2005 | Jha et al. ....................... | 705/14 |
| 2005/0227676 A1* | 10/2005 | De Vries .................. | 455/414.1 |
| 2007/0050256 A1* | 3/2007 | Walker et al. ................. | 705/14 |
| 2007/0294096 A1* | 12/2007 | Randall et al. ................. | 705/1 |
| 2009/0111462 A1* | 4/2009 | Krinsky et al. .............. | 455/423 |

FOREIGN PATENT DOCUMENTS

WO  WO 2006/060700 A2 *  6/2006

OTHER PUBLICATIONS

"Kadro Solutions Builds an Innovative Mobile and Integrated Web Services Solution for the Industry Leader in Food Safety Auditing." PR Newswire, New York, p. 1, May 20, 2002.*
Ynostroga, Roger. "Audience Polling Goes On-Line." Graphic Arts Monthly, p. 10, Aug. 1994.*
Priyantha et al. "The Cricket Location-Support System." ACM, pp. 32-43, 2000.*
"Executive Performance Group and IQPC Join Forces in a Strategic Alliance." PR Newswire (New York), p. 1, Oct. 30, 2003.*
"Harris Interactive Pioneers Instant Event-Polling at Park Avenue Festival 2000." Business Wire, p. 2371, Jul. 19, 2000.*
Wishert, Andrew. "Have Internet Will Travel: Is the Mobile Internet a Reality and, If So, Where in the Ether Can Companies Find It?" Computer Weekly, p. 44(1), Nov. 29, 2001.*
"Perseus Features Mobile Data Collection Software for Palm PoweredTM Handheld at PalmSource Conference; Establishing New Protocol for Events Worldwide." Business Wire, p. 2531, Feb. 5, 2002.*
DePaulo et al. "Wireless Keypad Surveys Get Audiences Involved." Marketing News, vol. 28, No. 22, p. 41, Oct. 24, 1994.*

* cited by examiner

*Primary Examiner*—Susanna M Diaz
(74) *Attorney, Agent, or Firm*—Osha • Liang LLP (57) ABSTRACT

A method for collecting feedback from a user, involving determining a location of the user using a user device comprising location detection, sending a feedback request corresponding to an entity at the location to the user device, providing feedback data responsive to the feedback request, wherein feedback data is supplied by the user and includes rating information associated with the entity, and transmitting feedback data and the location from the user device to a remote database.

22 Claims, 4 Drawing Sheets

MECHANISM FOR COLLECTING FEEDBACK FROM USERS

BACKGROUND

Typically, when a user receives a service, such as at a restaurant or a consumer store, the user forms an opinion about the service received. For example, a user may receive exceptional or poor service, which may influence the customer's willingness to return for that service at that particular location. User opinions may also influence others to whom the customer offers his/her opinion (e.g., friends, family, etc.). Today, with websites that specialize in posting user reviews of the service industry, users that receive any type of service are able to offer opinions to any other current or potential user of the same or similar type of service (e.g., vacation spots, restaurants, retail store services, guest speakers at business conventions, etc.).

Generally, to provide feedback, a user may use an online database that collects rating information regarding a particular entity at a location. More specially, a user typically uses a computer (or other electronic device) to provide feedback to a database that collects and displays rating information related to a service received at a particular location (or at an entity located at a particular location). For example, consider the scenario of a user dining at a restaurant. The user typically waits until after the meal has completed and the user returns home before posting a review of the restaurant for other potential users. Conventionally, this involves the user posting his/her opinion about the quality of the food, the ambiance of the restaurant, etc., on a website using a personal computer from his/her home or office. The user is required to find the exact location of the restaurant at which the user dined. That is, the user typically must find the particular restaurant from a listing of restaurants in the general area where the user dined.

As another example, consider the scenario in which a user attends a convention with multiple guest speakers at different times of the day and several booths set up for different services being offered. In this case, the user may wish to rate the different booths based on a set of criteria or rate the guest speakers on their speeches. Typically, the user may offer his/her opinion upon conclusion of the convention has completed on evaluations cards or surveys that are taken by the organization that set up the convention. Alternatively, the user may post ratings of the convention on a website. Using a website to rate multiple guest speakers may require the user to know which guest speaker spoke at which time of day and in which room of the convention. Similarly, rating the different booths that are set up at the convention may also require the user to determine specifics about the location and exhibitors of each of the different booths.

In some instances, if the user may be unable to remember or find the exact location where the service was received. For example, restaurant chains may have several locations within a five-mile radius, in which case remembering exactly which one was visited may be a challenge. Further, delay in providing feedback about a particular service that the user received, the user affects the accuracy of the feedback.

SUMMARY

In general, in one aspect, the invention relates to a method for collecting feedback from a user, comprising determining a location of the user using a user device comprising location detection, sending a feedback request corresponding to an entity at the location to the user device, providing feedback data responsive to the feedback request, wherein feedback data is supplied by the user and comprises rating information associated with the entity, and transmitting feedback data and the location from the user device to a remote database.

In general, in one aspect, the invention relates to a system for collecting feedback from a user, comprising a user device comprising location detection configured to determine a location of the user, wherein the user device is configured to receive a feedback request associated with an entity at the location and collect feedback data responsive to the feedback request, and a remote database configured to receive the feedback data, wherein the feedback data comprises rating information associated with the entity at the location.

In general, in one aspect, the invention relates to a data structure, comprising a first element comprising a location of a user, a second element comprising an entity located at the location, and a third element comprising feedback data for the entity, wherein the feedback data comprises rating information associated with the entity at the location, wherein the data structure is transferred between the user and a remote database.

In general, in one aspect, the invention relates to a computer readable medium having computer readable program code embodied therein for causing a computer system to execute a method for collecting feedback from a user, comprising determining a location of the user using a location detection device associated with a user device, sending a feedback request corresponding to an entity at the location to the user device, providing feedback data responsive to the feedback request, wherein feedback data is supplied by the user and comprises rating information associated with the entity, and transmitting feedback data and the location from the user device to a remote database.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. The use of "ST" in the figures corresponds to the use of "Step" in the detailed description below.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a mechanism for collecting feedback from users. More specifically, embodiments of the invention provide for a mechanism for collecting user feedback using a location detection device (e.g., a GPS device, a device that uses Wi-Fi location detection, etc.) that determines and stores the user's location. Further, embodiments of the invention combine the use of wireless communication, location detection, and a back-end remote database to collect user feedback.

Figure 1:
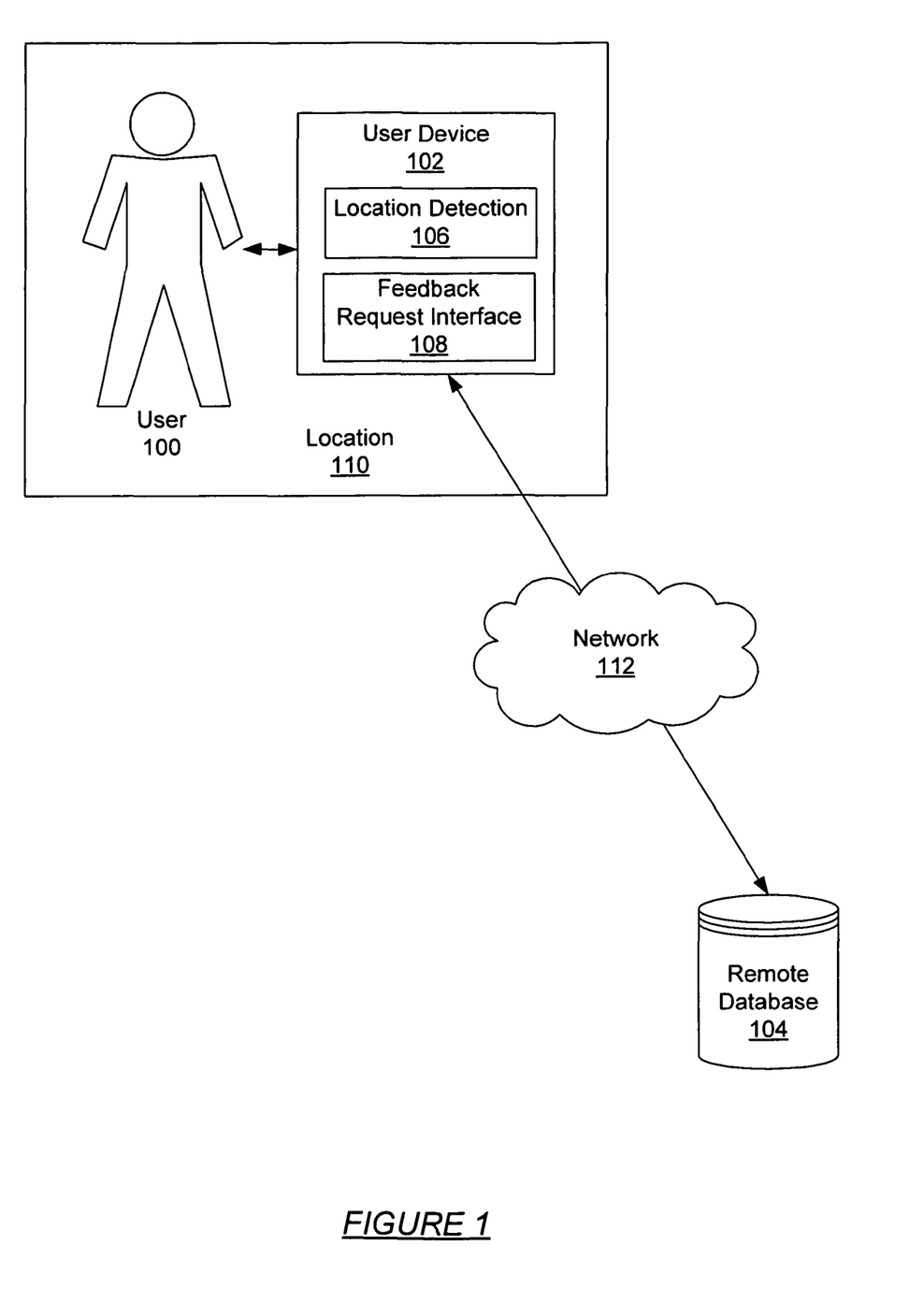
FIG. 1 shows a system for collecting user feedback in accordance with one or more embodiments of the invention.

FIG. 1 shows a system for collecting user feedback in accordance with one or more embodiments of the invention. Specifically, FIG. 1 shows a user (100) with a user device (102) located at a location (110), and a remote database (104) connected to the user device (102) via a network (112). Each of the aforementioned elements of FIG. 1 is described in detail below.

As described above, embodiments of the invention are directed toward collecting user feedback that is associated with a location (110) of the user (100). User feedback data is data associated with an entity located at the user's location (110). Specifically, the user (100) may be physically present at the location (110). At this location (110), the user (100) may receive one or more services from an entity located at the location (110). In one or more embodiments of the invention, a service may be anything that the user (100) receives or any information that the user (100) may be asked to provide at the location (110). For example, if the user is at a restaurant, then the user may receive common restaurant services. In this case, the restaurant is the entity located at the user's location, and the location may be a physical address or street intersection where the restaurant is located. Further, in one or more embodiments of the invention, feedback data provided by the user (100) may be time-dependent. That is, the user (100) may receive a service at the location (110) at a particular time (described below).

Alternatively, in one or more embodiments of the invention, the user (100) may be prompted to provide information dependent upon the location (110). For example, if a user has completed voting at a particular election poll location, then the user may be prompted in an exit poll to provide specific feedback as to how the user voted related to the particular election poll location (i.e., for only the candidates that appeared on the ballot for the particular poll location). In this case, the "service" is the election poll. Thus, a service may be something the user (100) receives at the location (110), or an action that the user (100) performs at the location (110), for which the user (100) may provide feedback data to the remote database (104). Other examples of services may include hearing a guest lecturer at a convention, receiving services at a grocery store, etc.

In one or more embodiments of the invention, feedback data provided by the user (100) may be rating information associated with a service that the user (100) receives at an entity located at the location (110). For example, rating information may include a positive or a negative (e.g., yes or no) rating of the service received. Alternatively, rating information may be a numerical rating on a numerical scale to rate the service received by the user (100) (e.g., a rating from 1 to 10, where 10 is a very positive rating and 1 is a very poor rating, a star rating, where stars (or portions of stars) are given base on the quality of service provided, etc.). Feedback data may also be a complete review of an entity (e.g., a product, service, event, etc.) in a written or oral form.

Those skilled in the art will appreciate that feedback data may be unrelated to rating a service. In fact, feedback data may be provided where a rating component (or information) is nonsensical. Those skilled in the art will appreciate that while FIG. 1 only shows a single user device (102), more than one device may be used in one or more embodiments of the invention. As described above, a user (100) may perform an action at the location (110) and feedback data associated with the specific action may be provided by the user (100). For example, feedback data may be associated with answers to survey questions, census information, demographic information, election poll results, etc. Further, one skilled in the art will appreciate that the phrase "rating information" as used in this application covers any type of information that the user may provide as feedback data and is not meant to be limited to information related to rating a service.

Returning to FIG. 1, in one or more embodiments of the invention, the user (100) uses the user device (102) to provide feedback data to the remote database (104). The user device (102) may be any hand-held electronic device, such as a mobile phone, personal digital assistant (PDA), pager, camera, etc. In one or more embodiments of the invention, the user device (102) includes a feedback request interface (108) and location detection (106) component. The location detection (106) includes functionality to determine the user's location (110). In one or more embodiments of the invention, the location (110) represents the current location of the user (100) holding the device (102). That is, the location detection (106) determines the location at which the user (100) (in possession of the device (102) with the location detection (106) component) is physically present at the time that the location (110) is being determined.

In one or more embodiments of the invention, the location detection (106) may use global positioning satellite (GPS) to determine the location (110). Further, location detection (106) may be performed by determining the latitude, longitude, and height of the location (110). Those skilled in the art will appreciate that the location detection (106) functionality of the user device (102) may employ methods other than GPS to determine the location (110). For example, the location detection device may use Wi-Fi location detection or other similar technology. In addition, those skilled in the art will appreciate that the location (110) may also be determined by a location detection device (not shown) that is not associated with the user device (102). For example, the user may carry an individual location detection device, or location detection may be performed by a separate device permanently present at the location of the user.

As described above, feedback data provided by the user (100) may be both time- and location-dependent. In this case, the user device (102) may also include functionality to determine the time that the user (100) received a service at the location (110), and the feedback request may store the time that the user (100) received the service in addition to the location (110).

In one or more embodiments of the invention, the feedback request interface (108) of the user device (102) is configured to provide an interface for the user (100) to provide feedback data. The feedback request interface (108) may be a web interface, a graphical user interface, or any other type of interface capable of being presented to the user (100) on the user device (102). Specifically, the feedback request interface (108) provides a feedback request (not shown) to the user (100). In one or more embodiments of the invention, the feedback request is a form that the user (100) completes by inserting feedback data. For example, if the user's feedback data consists of rating information, then the feedback request may include a numerical scale from which the user (100) can select a number to rate the service received. Alternatively, if the user's feedback data consists of answers to survey questions, the feedback request may be a form that includes blank fields in which the user (100) can provide the answers to the survey questions. Those skilled in the art will appreciate that a form, as defined herein, is anything that the user is able to add data to (or modify data) and invoke transmission of the feedback data to the remote database. Thus, those skilled in the art will appreciate that feedback request may be a very simple form with a few blank lines for the user to complete, or the feedback request may be a complicated form with many questions for the user to answer.

In one or more embodiments of the invention, the feedback request includes a data structure capable of storing the location (110) of the user (100), the entity located at the location (e.g., the name of a restaurant, the name of a grocery store, an election polling site, etc.), and feedback data. Thus, if the feedback request is a form that the user (100) completes, the form may be associated with a data structure that stores the location (110), the entity located at the location (110), and the user's feedback data. For example, the data structure may be an array (or other hierarchical data structure) with three elements that are populated with a location (e.g., 213 Circle Point Drive), an entity location at the location (e.g., a Pizza Hut), and feedback data that includes rating information associated with the entity located at the location (e.g., a service rating of 6 out of 10). Further, in one or more embodiments of the invention, if the user's feedback data is time-dependent, then the data structure associated with the feedback request may also store the time at which the user (100) was at the location (100) detected by the location detection (106) functionality. In one or more embodiments of the invention, the feedback request may store feedback data provided by the user (100) in a data structure temporarily, until the feedback data is transmitted to the remote database (104). At that stage, the data structure may be routinely synchronized between the user device (102) and the remote database (104).

Those skilled in the art will appreciate that the data structure associated with the feedback request may be created when the feedback request is sent to the user device, and is populated when the user responds to the feedback request. Thus, initially, the data structure may exist with null (empty) elements. Once the user decides to provide feedback data, the data structure may be populated with one or more of the following bits of information: the location, entity, feedback data, and (optionally) the time. Alternatively, the data structure is persistent and merely linked to the feedback request and populated based on the location (110) detected by the location detection (106) functionality.

Upon completion of the feedback request, the feedback request (containing feedback data) is transmitted to the remote database (104) via the network (112). The network (112) may be any wired or wireless network, and the user's feedback data may be transmitted using any of a variety of wireless and wired protocol, e.g., Wi-Fi, IEEE wireless protocols, Transport Control Protocol (TCP)/Internet Protocol (IP), etc. For example, the feedback data may be gathered and transmitted "on the spot" via the wireless network or merely gathered "on the spot" and stored for later transmission upon reaching a wired network.

The remote database (104) is a repository configured to store feedback data regarding one or more services received at an entity located at the location (110), or regarding any action the user performed while at the location (110). Further, the remote database is configured to store feedback data from other users regarding the same entity or action performed at the location (110). Those skilled in the art will appreciate that the remote database may be any storage device capable of receiving and storing user feedback data from multiple users. Further, the remote database may be located on a back-end server associated with the system of FIG. 1.

In one or more embodiments of the invention, the remote database (104) aggregates feedback data from multiple users and outputs/displays an aggregated result associated with the location (110). For example, if the user feedback data includes rating information associated with a service received, then several users that received the same service at the same location may also submit feedback data associated with the service. Alternatively, suppose the feedback data is associated with election exit poll results. In this case, each user that voted in the election may submit user feedback as to how they voted. In the aforementioned cases, an aggregated result would be useful to get an overall picture of how multiple users rated the same service or how multiple voters voted in an election. Thus, the remote database (104) includes functionality to aggregate rating information and output the aggregated feedback data associated with the location (110) of the user (100). In one or more embodiments of the invention, the aggregated feedback data may be displayed for potential users to view, e.g., on a website, broadcast medium, or other public space. Alternatively, the aggregated feedback data may be provided to the entity located at the location (110) of the use (100), so that the entity can constructively use the aggregated feedback data.

Figure 2:
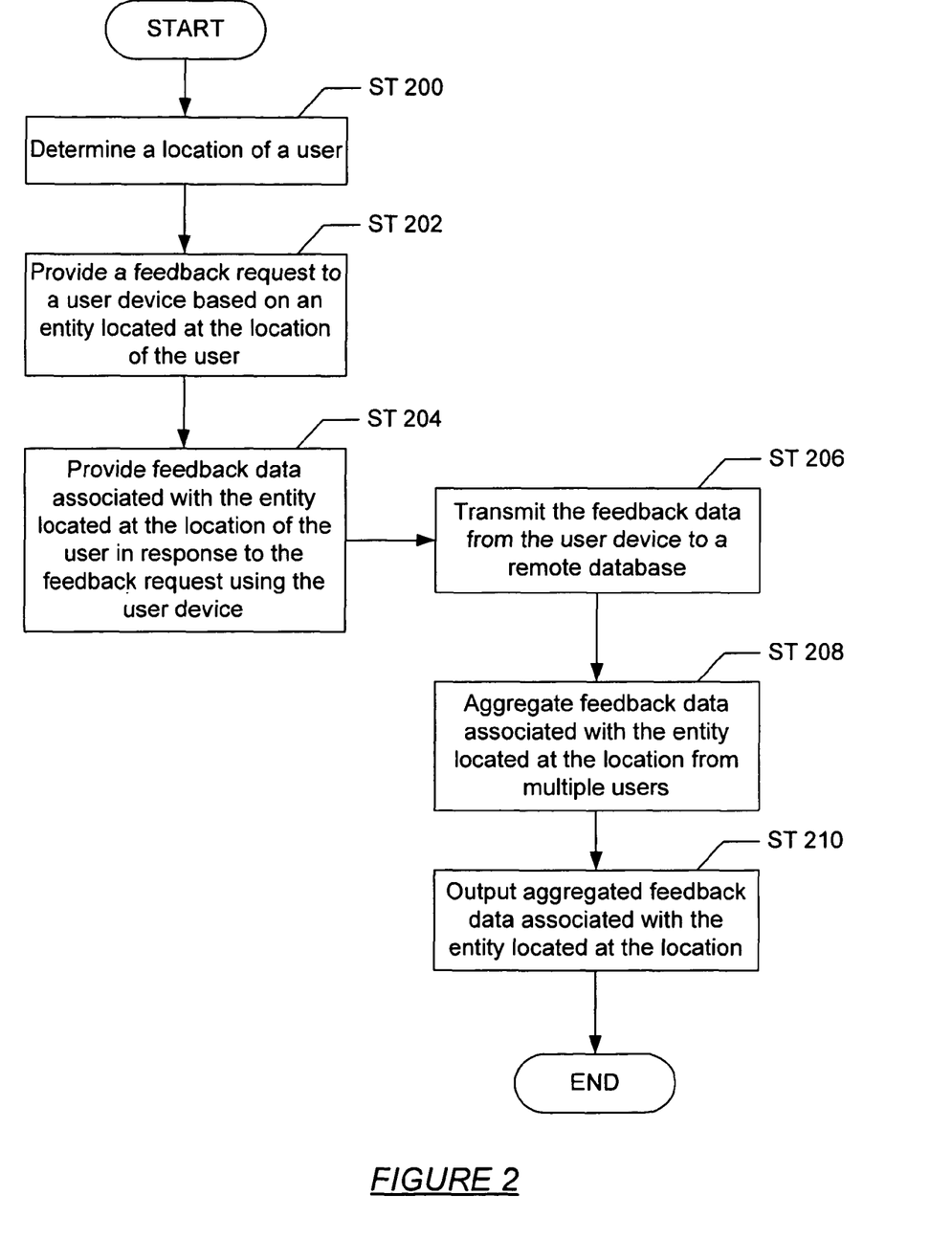
FIG. 2 shows a flow chart for collecting user feedback in accordance with one or more embodiments of the invention.

FIG. 2 shows a flow chart for collecting user feedback in accordance with one or more embodiments of the invention. Initially, the user's location is determined (Step 200). Subsequently, the user is provided with a feedback request associated with an entity located at the user's location (Step 202). In one or more embodiments of the invention, the feedback request may be sent to the user device from the remote database. In this case, the remote database may periodically poll the user device to determine whether the user is physically present at an entity for which the user may want to provide feedback data. Said another way, the remote database may track the user's location and provide the user with a feedback request when appropriate. Alternatively, in one or more embodiments of the invention, the user may initiate the feedback request by indicating to the remote database that the user is at a location for which the user wants to provide feedback data.

Regardless of how the feedback request is initiated, upon obtaining the feedback request, the user provides feedback data associated with the entity located at the location (Step 204). Specifically, using the feedback request interface of the user device, the user completes the feedback request associated with the entity at the location of the user. As described above, the feedback request is associated with the location of the user. Thus, even if the user completes the feedback request received at the location while the user is no longer physically present at the location, the feedback data is correctly associated with the location because the location when the request is sent (or created) is stored (and remains) in the feedback request itself. Alternatively, in one or more embodiments of the invention, the user may provide feedback data while physically present at the location. That is, the user may provide "on the spot" feedback data associated with the user's location, before the user leaves the location. In such a case, while the location information is know and accounted for, it may or may not be stored in the request depending on the implementation of the invention.

Those skilled in the art will appreciate that there may be instances in which no entity located at the location of the user exists. For example, the user may be prompted to answer survey questions while at a particular location. However, the answers to the survey questions may not be associated with an entity at the location. In this case, the user may complete the feedback request and transmit the feedback data to the remote database without the feedback data being associated with an entity at the user's location (i.e., the feedback data is only associated with the user (our user device) and the location).

Continuing with FIG. 2, the user's feedback data, once collected, is immediately transmitted from the user device to the remote database (Step 206). Alternatively, the user feedback data is stored and transmitted via a wired (or wireless) network once an active network is reached. In one or more embodiments of the invention, the user feedback data is transmitted wirelessly to the remote database. At this stage, the remote database (208) may aggregate the feedback data associated with the entity located at the determined location from multiple users (Step 210). Finally, the remote database outputs aggregated feedback data associated with the entity located at the location (Step 212).

To illustrate the process described in FIG. 2, consider the restaurant scenario discussed above. In this case, a user receives services at the restaurant, and while the user is physically present at the restaurant, the user can initiate or download a feedback request to complete regarding the services received at the restaurant. Specifically, a user device acting as a location detection device can determine the exact location of the restaurant, and the feedback request stores this location. In this manner, when the user completes the feedback request (whether that is done while the user is physically at the restaurant or at a later point in time), the user's feedback data is associated with the restaurant located at the location determined by the location detection device. In this scenario, the feedback data may include rating information, such as the quality of the food served, the ambiance of the restaurant, the friendliness of the staff, or an overall rating of the restaurant. As mentioned above, the rating information may be submitted as a numerical score, a positive/negative indication, or any other manner that provides a review of the restaurant. Using the method described in FIG. 2, the user can immediately associate his/her feedback data with the correct restaurant without having to figure out which exact location of the restaurant was visited.

Figure 3:
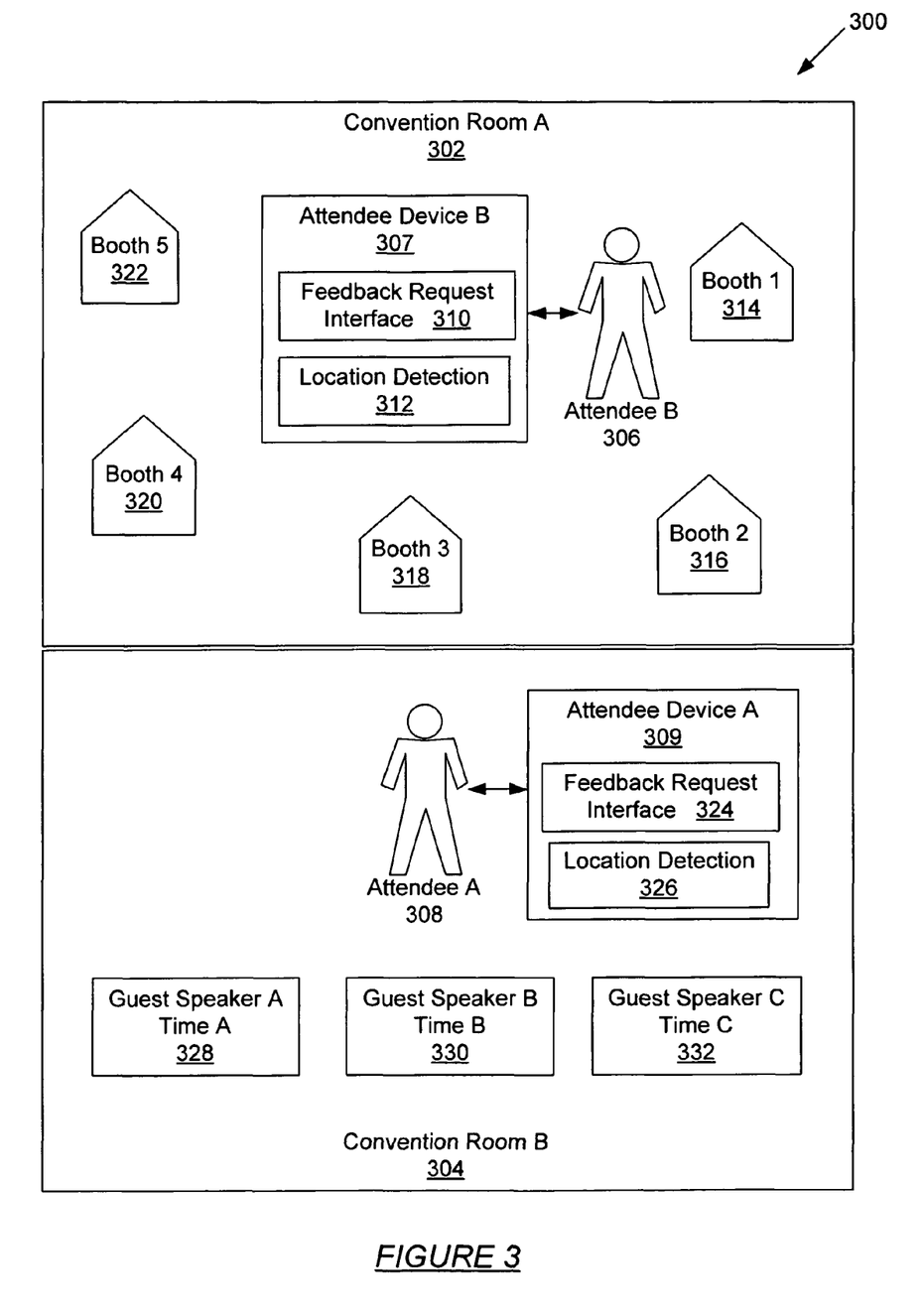
FIG. 3 shows an example of collecting user feedback in accordance with one or more embodiments of the invention.

FIG. 3 shows another example of the collecting user feedback in accordance with one or more embodiments of the invention. More particularly, FIG. 3 illustrates collecting feedback data that is both location and time dependent. Consider the aforementioned convention example in which multiple users attend a convention including different exhibitor booths and various guest speakers. Using the same scenario, FIG. 3 shows a convention (300) with two rooms (i.e., Convention Room A (302), Convention Room B (304)). Convention Room A (302) includes different exhibitor booths (i.e., Booth 1 (314), Booth 2 (316), Booth 3 (318), Booth 4 (320), Booth 5 (322)) at which Attendee B (306) is browsing. Convention Room B (304) includes the setting for different guest speakers lecturing at different times of the day (i.e., Guest Speaker A lecturing at Time A (328), Guest Speaker B lecturing at Time B (330), and Guest Speaker C lecturing at Time C (332)) where Attendee A (308) is located.

Now suppose that Attendee B (306) is receiving the service(s) offered at Booth 1 (314). Upon receiving the service(s), Attendee B (306) may be polled to provide rating information regarding the services of Booth 1 (314). Alternatively, Attendee B (306) may initiate a feedback request using Attendee Device B (307) to provide rating information associated with services received at Booth 1 (314). In this case, the location detection (312) functionality of Attendee Device B (307) is configured to determine the exact location of Attendee B (306), including which room of the convention, and at which of the five booths Attendee B (306) is currently located. Further, the Attendee Device B (307) provides Attendee B (306) with a feedback request (not shown). Using the feedback request interface (310) of Attendee Device B (307), Attendee B (306) may complete the feedback request to provide feedback data regarding the services of Booth 1 (314). Alternatively, Attendee B (306) may choose to complete the feedback request at a later time, in which case Attendee Device B (307) stores the feedback request (which is marked with the exact location of Attendee B (306) at the time the feedback request was initiated). This may be useful, for example, if Attendee B (306) wishes to respond to several feedback requests for one or more booths (314, 316, 318, 320, 322) at a later point in time. However, because the feedback request stores the location of Attendee B (306) at the time that the feedback request was sent to Attendee Device B (307), Attendee B (306) does not need to complete the feedback request immediately to ensure that his/her feedback data is correctly associated with Booth 1 (314). Further, as Attendee B (306) physically moves within Convention Room A (302), the location detection (312) functionality of Attendee Device B (307) is able to continually determine the exact location of Attendee B (306).

Continuing with FIG. 3, as mentioned above, Attendee A (308) is located in Convention Room B (304) to listen to the guest speakers' lectures. Using features of the present invention described above, Attendee A (308) can provide feedback data associated with each guest speaker (i.e., Guest Speaker A, Guest Speaker B, Guest Speaker C), and the feedback data is correctly matched with the appropriate guest speaker based on both the location of Attendee A (308) and the time at which a feedback request is initiated using Attendee Device A (309). For example, consider the scenario in which multiple convention rooms exist with guest speakers lecturing at different times, where times for guest speaker lectures overlap between the multiple convention rooms. The location detection (326) functionality of Attendee Device A (309) determines that Attendee A (308) is in Convention Room B (304), and the feedback request stores the time at which the feedback request was initiated (either by Attendee A (308) or some other external tracking mechanism). Thus, when Attendee A (308) completes the feedback request using the feedback request interface (324) of Attendee Device A (309) (i.e., either during the guest speaker's lecture, immediately after the guest speaker's lecture, or some later point in time), the feedback data can be accurately matched with the guest speaker that lectured at the location determined by the location detection (326) and the time stored in the feedback request.

Feedback data provided by Attendee A (308) at the convention (300) can be used for many purposes. For example, if rating information of the various guest speakers is provided directly after they have lectured, the feedback data may be used to adjust the compensation paid the guest speakers. Feedback data associated with the exhibitor booths provided by Attendee B (306) may also be used to improve the service for other attendees for the next day of the convention, for example.

Figure 4:
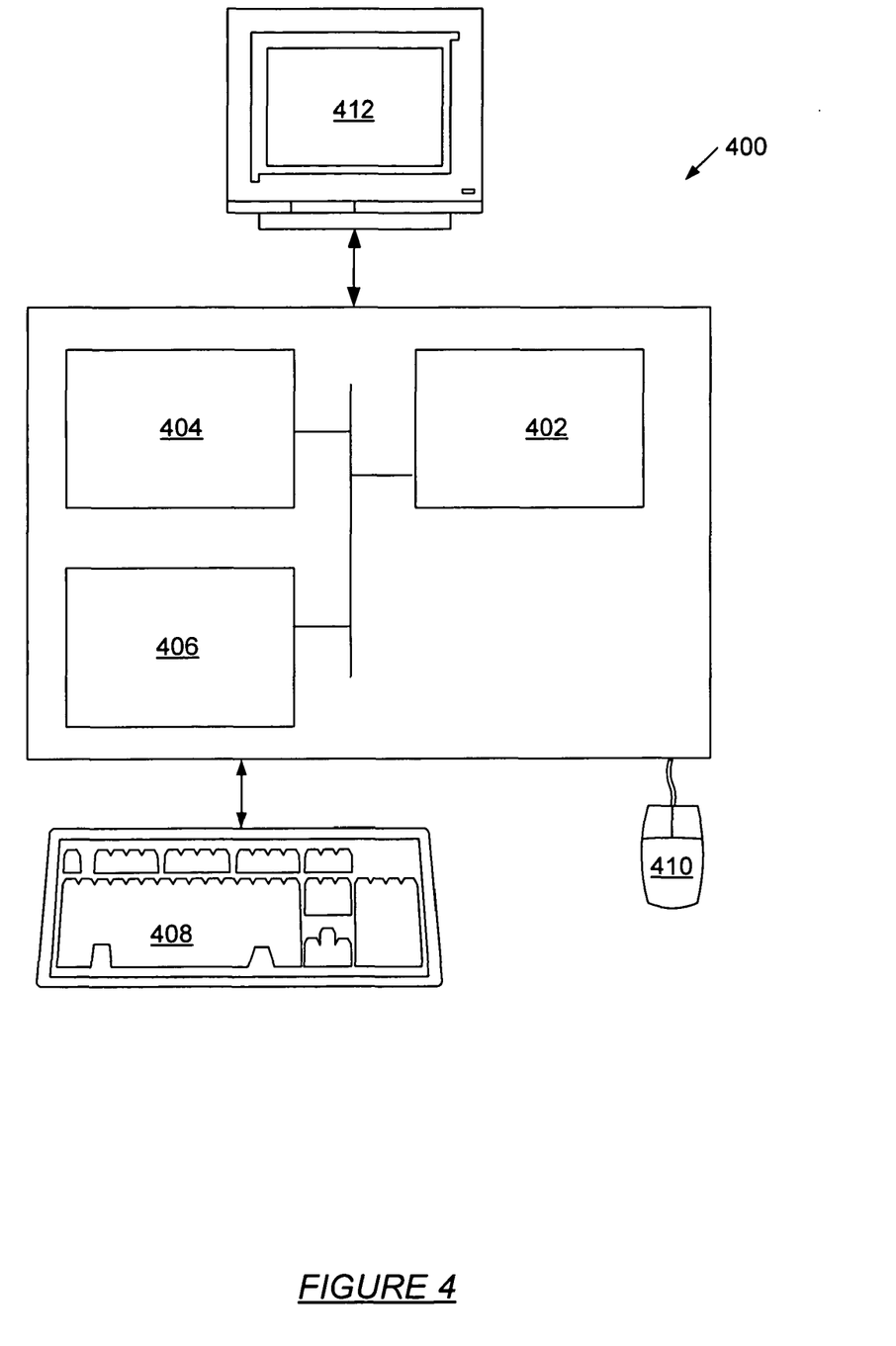
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., remote database, data structure, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for collecting feedback from a user, comprising:
    obtaining a first location of the user, wherein the user is using a user device comprising location detection functionality, wherein the first location of the user is determined by the user device;
    sending a first feedback request to the user device in response to obtaining the first location of the user, wherein the first feedback request is sent to the user device while the user is at the first location and the first feedback request corresponds to a series of events taking place at an entity located at the first location of the user, wherein the first feedback request is a form comprising at least one field for user input regarding at least one service received from the entity and the series of events;
    providing first feedback data responsive to the feedback request, by the user while attending the series of events and receiving the at least one service at the entity, wherein the first feedback data is supplied by the user by entering data in the at least one field of the form and comprises rating information associated with the series of events and the service at the entity,
        wherein the data entered by the user in the at least one field, the first location of the user, and the first feedback data is stored in a data structure on the user device, wherein the data structure is used to temporarily store data;
    obtaining a second location of the user by the user device, wherein the user performs an action at the second location;
    sending a second feedback request to the user device in response to the action performed by the user at the second location;
    providing second feedback data responsive to the second feedback request, by the user while performing the action at the second location, wherein the second feedback data comprises rating information associated with the performed action,
        wherein the second location of the user and the second feedback data is stored in the data structure on the user device;
    periodically synchronizing the first and second feedback data and the first and second location from the data structure stored in the user device to a remote database, wherein the first and second feedback data includes a timestamp of the series of events and the performed action; and
    evaluating a quality of the series of events, the entity, the performed action, and the first and second location, using the first and second feedback data provided by the user.

2. The method of claim 1, wherein the feedback data and the location are transmitted wirelessly.

3. The method of claim 1, wherein the feedback data comprises rating information associated with a particular time.

4. The method of claim 3, wherein rating information comprises at least one selected from the group consisting of a numerical score based on a numerical scale, a positive or negative indication of a service, and an answer to at least one question associated with the service.

5. The method of claim 1, wherein location detection comprises global positioning satellite (GPS).

6. The method of claim 1, wherein the remote database is configured to aggregate a plurality of feedback data from multiple users.

7. The method of claim 6, wherein the remote database is further configured to output aggregated feedback data associated with the location.

8. The method of claim 1, wherein location detection is configured to determine the latitude and longitude of the location.

9. The method of claim 8, wherein location detection is configured to determine the height of the current location.

10. The method of claim 1, wherein the feedback request is sent from the remote database.

11. The method of claim 1, wherein the feedback request is sent by polling the user device to determine when the user is physically at the entity associated with the location.

12. The method of claim 1, wherein the feedback request is initiated by the user device, wherein the user device informs the remote database that the user is at the location.

13. A system for collecting feedback from a user, comprising:
    a user device comprising location detection configured to:
        determine a first location of the user using the location detection,
        receive a first feedback request while the user is at the first location, wherein the first feedback request corresponds to a series of events taking place at an entity located at the first location of the user,
        collect first feedback data responsive to the first feedback request while the user is attending the series of events and receiving at least one service at the entity, wherein the first feedback request is a form comprising at least one field for user input regarding the at least one service received from the entity and the series of events, and
            wherein data entered by the user in the at least one field, the first location of the user, the entity, and the first feedback data is stored in a data structure on the user device, wherein the data structure is used to temporarily store data; and
        determine a second location of the user by the user device, wherein the user performs an action at the second location;
        receive a second feedback request in response to the action performed by the user at the second location while the user is at the second location; and
        collect second feedback data responsive to the second feedback request while the user performs the action at the second location, wherein the second feedback data comprises rating information associated with the performed action, wherein the second location of the user and the second feedback data is stored in the data structure on the user device;

a remote database configured to receive the first and second feedback data from the data structure, wherein the data structure is periodically synchronized with the remote database, and wherein the feedback data is used to evaluate a quality of the at least one service provided by the entity at the location, the series of events, the first and second location, and the performed action.

14. The system of claim 13, wherein the feedback data and the location are transmitted wirelessly from the user device to the remote database.

15. The system of claim 13, wherein rating information comprises at least one selected from the group consisting of a numerical score based on a numerical scale, a positive or negative indication of the service, and an answer to at least one question associated with the service.

16. The system of claim 13, wherein the feedback data comprises rating information associated with a particular time.

17. The system of claim 13, wherein location detection comprises global positioning satellite (GPS).

18. The system of claim 13, wherein the remote database is configured to aggregate a plurality of feedback data from multiple users.

19. The system of claim 18, wherein the remote database is further configured to output aggregated feedback data associated with the location.

20. The system of claim 13, wherein location detection is configured to determine the latitude and longitude of the location.

21. The system of claim 20, wherein location detection is configured to determine the height of the location.

22. A non-transitory computer readable medium having computer readable program code embodied therein for causing a computer system to execute a method for collecting feedback from a user, comprising:

obtaining a first location of the user, wherein the user is using a user device comprising location detection, wherein the location of the user is determined by the user device;

sending a first feedback request to the user device in response to obtaining the first location of the user, wherein the first feedback request is sent to the user device while the user is at the first location and the first feedback request corresponds to a series of events taking place at an entity located at the first location of the user, wherein the first feedback request is a form comprising at least one field for user input regarding at least one service received from the entity and the series of events;

providing first feedback data responsive to the feedback request, by the user while attending the series of events and receiving the at least one service at the entity, wherein the first feedback data is supplied by the user by entering data in the at least one field of the form and comprises rating information associated with the series of events and the service at the entity, wherein the data entered by the user in the at least one field, the first location of the user, and the first feedback data is stored in a data structure on the user device, wherein the data structure is used to temporarily store data;

obtaining a second location of the user by the user device, wherein the user performs an action at the second location;

sending a second feedback request to the user device in response to the action performed by the user at the second location;

providing second feedback data responsive to the second feedback request, by the user while performing the action at the second location, wherein the second feedback data comprises rating information associated with the performed action, wherein the second location of the user and the second feedback data is stored in the data structure on the user device;

periodically synchronizing the first and second feedback data and the first and second location from the data structure stored in the user device to a remote database wherein the first and second feedback data includes a timestamp of the series of events and the performed action; and evaluating a quality of the series of events, the entity, the performed action, and the first and second location, using the first and second feedback data provided by the user.

\* \* \* \* \*